No. 866,914.
PATENTED SEPT. 24, 1907.
J. A. CHEAPE.
DEVICE FOR CALCULATING THE PRICE OF ARTICLES.
APPLICATION FILED MAY 4, 1907.
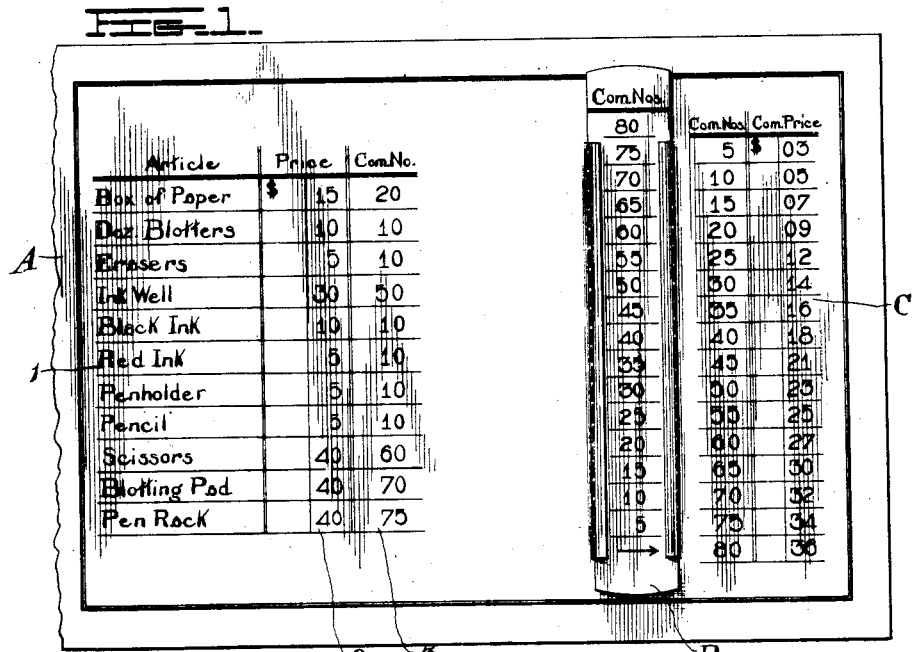
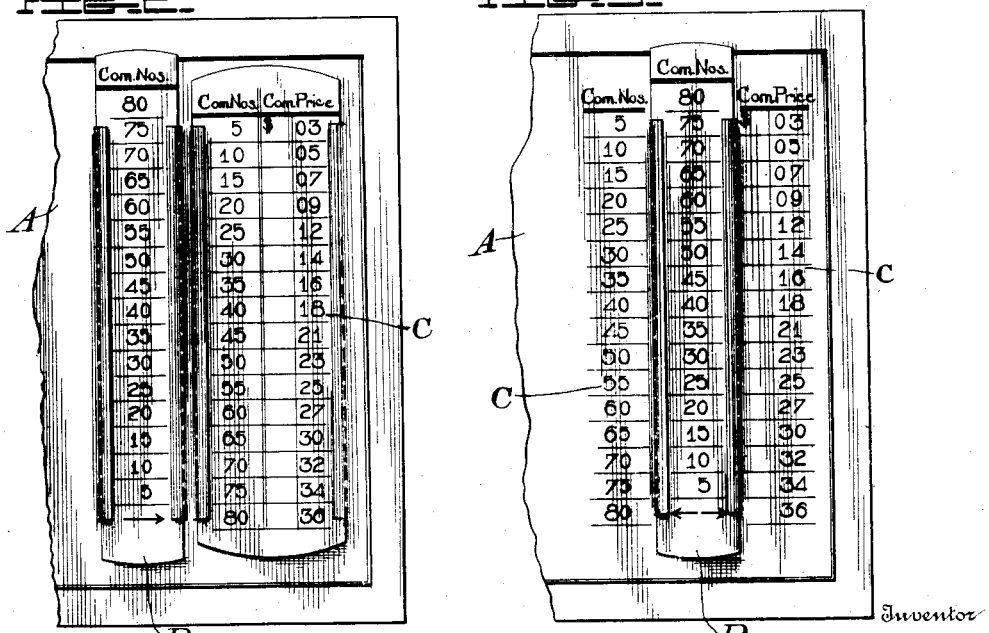

UNITED STATES PATENT OFFICE.

JOHN ALBERT CHEAPE, OF CHARLOTTESVILLE, VIRGINIA.

DEVICE FOR CALCULATING THE PRICE OF ARTICLES.

No. 866,914.  Specification of Letters Patent.  Patented Sept. 24, 1907.

Application filed May 4, 1907. Serial No. 371,848.

*To all whom it may concern:*

Be it known that I, JOHN ALBERT CHEAPE, a citizen of Great Britain, residing at Charlottesville, in the county of Albemarle and State of Virginia, have invented certain new and useful Improvements in Devices for Calculating the Price of Articles, of which the following is a specification.

My invention relates to an improvement in a device for indicating and calculating the price of certain articles, bought in large numbers, and the object is to provide a device which can be published in a catalogue, or other advertising medium whereby a person can buy a single article at a certain price, or by buying two or more he will be able to get a special or club price. This device is adapted to be used in obtaining subscriptions for magazines and the like, by giving the price of the magazine and also showing by taking or subscribing for two or more magazines a special or club price will be given.

My invention relates to certain features of construction and combinations of parts which will be hereinafter described and pointed out in the claims.

In the accompanying drawing:—Figure 1 is a view showing how my device can be applied to a catalogue. Figs. 2 and 3 are modifications.

A, represents the page of a catalogue, or any other advertising medium, and 1 is a list of articles, which for convenience is a list of stationery articles. Following these articles is a list of prices 2, which gives the cost of the article separately, and 3 is the combination or club numbers, a number being given to the price of each article, and which are arranged by the dealer, whereby the several numbers can be added together and a certain price given, which will be described hereinafter, and the articles sold at a profit to the dealer.

B, is a key, which is shown slidable upon the page, and upon this key is placed the combination or club numbers beginning with the smallest number at the bottom and having the larger number at the top of the key.

C, is the indicator or indicating means which may be made integral with the sheet or slidable as shown in Fig. 2. The indicator is composed of the combination or club numbers with the smallest number at the top and the larger at the bottom, and opposite each club number is a certain price, which indicates the price of the articles when taken together, that is, taking two or more articles together and their total, when added, the price will be opposite the total.

The method of operation for computing the several numbers and prices is as follows: Taking for instance the articles scissors and box of paper, the scissors are given the club number of 60, and the box of paper 20, by sliding the key B until the number 60 on the key is opposite the number 20 on the indicator, the arrow at the bottom of the key will give the total on the indicator as 80, and opposite the number 80 will be the price of both articles, which is given as thirty-six cents (\$.36). Another example, is by taking the box of paper, the club number being 20, and a pen holder and black ink, the club number of both is 10; now by sliding the key so that the number 10 will register with the number 20 on the indicator, and the arrow will point at 30, then there is still the number 10 for the black ink, so the number 10 on the key is brought into registry with the number 30 on the indicator, and the arrow will point at 40, on the indicator, and the price of the three articles will be eighteen cents (\$.18).

Of course the combination price and club numbers are arbitrary and can be arranged by the dealer to suit his prices at which he can sell the goods in quantities at a reduced price from what they are retailed when bought separately.

In the modifications, I have shown in Fig. 2 the indicator and key both slidable, and in Fig. 3 the indicator C has the combination or club price list on one side of the slidable key B, and the combination or club numbers on the other side of the key.

It will be seen that I can use this device with any line of goods or periodicals, and I do not wish to be limited to the exact form and arrangement of the several parts described, as slight changes might be made therein.

Having fully described my invention, what I claim as new and desire to secure by Letters Patent, is:—

1. A device for calculating the price of articles, comprising a list of articles and club numbers, an indicator and key for computing the club numbers.

2. A device for calculating the price of articles, comprising a list of articles and club numbers, an indicator and key having club numbers thereon, and means whereby the club numbers are computed.

3. A device for calculating the price of articles, comprising a list of articles, prices and club numbers, an indicator having club numbers and prices thereon, a key having club numbers, and means whereby the indicator and key are adapted to compute the club numbers of the different articles.

4. A device for calculating the price of articles, comprising a list of articles and club numbers, an indicator having club numbers and club prices thereon, a key having club numbers in reverse order, and means whereby the indicator and key are adapted to compute the club numbers of the different articles and their total giving the price of the several articles.

5. A device for calculating the price of articles, comprising an indicator having club prices and numbers thereon, and a key having club numbers in reverse order.

6. A system of calculating comprising a list of price marks, a club number which goes with each price mark, an indicator having a combination price and number, and a key having combination numbers which when placed in certain relations to the combination numbers on the indicator will designate the combination price of the whole number of articles purchased.

In testimony whereof I have signed my name to this specification in the presence of two subscribing witnesses.

JOHN ALBERT CHEAPE.

Witnesses:
    MALVINA T. CHEAPE,
    J. O. H. PENDLETON.